United States Patent Office 2,844,504
Patented July 22, 1958

2,844,504

1,1,2-TRI-(1-CYANOETHYL) HYDRAZINE, METHOD OF PREPARING, AND COMPOSITIONS AND METHODS FOR CONTROLLING NEMATODES

Robert P. Parker, Ridgewood, and John F. Hosler, Bound Brook, N. J., assignors to American Cyanamid Company, New York, N. Y., a corporation of Maine No Drawing. Application March 26, 1956
Serial No. 573,603

5 Claims. (Cl. 167—22)

This invention relates to a new and novel tri-cyanoethyl hydrazine and to a method for its preparation. More particularly, it relates to 1,1,2-tri-(1-cyanoethyl) hydrazine characterized by the formula:

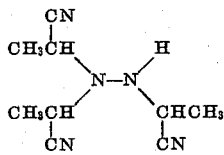

The tri-cyanoethyl hydrazine of the present invention may be prepared by reacting anhydrous hydrazine or hydrazine hydrate with at least three mols or more of lactonitrile until dehydration is complete. In general, a temperature within the range of from about zero degrees centigrade up to the reflux temperature of the mixture may be used. Usually from about 20° C. to about 100° C. is employed. The reaction may be illustrated by the following general equation:

Although three mols of lactonitrile are required in the aforedescribed reaction, it has been found that theoretical excess of lactonitrile can be used without completely converting all the hydrogen atoms of the hydrazine molecule to form a tetra-cyanoethyl derivative. This is an advantage of the invention because a precise addition of lactonitrile is of no moment. Usually, at least three mols of lactonitrile are required as stated above. However, as much as four or five mols of lactonitrile may be conveniently added without any undesirable effect.

The tri-cyanoethyl hydrazine compound of the present invention is a liquid, immiscible in water but miscible in most common organic solvents, such as benzene or kerosene. Its boiling point is 122° C.–123° C. at 1 mm. Hg pressure and its refractive index is 1.4663.

The compound as defined is effective as a nematocide especially in the treatment of soil nematodes. Nematodes are widely distributed in many soils. Further, nematodes are injurious to both plant and tree crops. 1,1,2-tri-(1-cyanoethyl) hydrazine is found to effectively eradicate or arrest diseases of plants and trees caused by nematodes. It is contemplated that a preferred practice will be to apply the compound of the invention in concentrations of about 0.01%, although more or less may be used. The compound may be absorbed on inert solid carriers such as fuller's earth, talc, pyrophyllite, diatomaceous earth, and the like. Alternatively, the compound may be added to aerosol sprays or to water-immiscible organic solvents.

According to the present invention, the tri-cyanoethyl hydrazine compositions are applied to the soil in amounts within the general range of from about 50 to 300 pounds of the active toxicant (hydrazine derivative) per acre. Within this range, rates of from about 100 to about 200 pounds per acre usually will be employed.

The concentration of the 1,1,2-tri-(1-cyanoethyl) hydrazine in a dusting composition will be widely varied, depending upon the manner in which the composition is to be applied. In general, a useful dusting composition may contain from as little as about 0.01% to as much as about 90% of the tri-cyanoethyl derivative. Compositions vary depending on whether subsequent dilution before use is intended. The remainder is usually a solid inert carrier but in some cases a supplemental active ingredient for some other purpose may be combined therewith. These may include soil-conditioning and fertilizing materials.

In preparing aqueous emulsion compositions for use, the tri-cyanoethyl hydrazine of this invention is dissolved in a suitable solvent, preferably a water-immiscible solvent such as benzene, kerosene or other hydrocarbon solvents, and this solution is thoroughly stirred into water, preferably utilizing a wetting agent. Typically illustrative wetting agents are sodium dioctyl sulfosuccinate (Aerosol OT) and alkylaryl polyether alcohols, such as Triton X–100. Many commercially equivalent compounds for the purpose are well known and available.

The following examples will serve to illustrate a preferred embodiment of the invention wherein the tri-cyanoethyl hydrazine derivative is prepared and incorporated into inerts as above defined. Resultant compositions are shown to possess good nematocidal activity. It is to be understood that the examples are not to be taken as limitations upon the invention. Unless otherwise stated, the parts are by weight.

Example 1

12.5 parts of hydrazine hydrate and 71 parts of lactonitrile are stirred in suitable apparatus and heated over a steam bath until dehydration is complete. Completion of the reaction takes place in about three hours. Water and excess lactonitrile are distilled off. 1,1,2-tri-(1-cyanoethyl) hydrazine is collected at 155° C.–160° C. under vacuum. This product is further fractionated through a glass packed column at a reduced pressure of about 1 mm. Hg pressure. The boiling point of the tri-cyanoethyl hydrazine is 122° C.–123° C., having a refractive index ($N_D^{20}$) of 1.4663. Upon analysis, the percent carbon, hydrogen and nitrogen found in the compound is 56.85%, 7.06% and 35.5%.

Example 2

An aqueous suspension of 100 Anguillula nematodes in 4 cc. of water containing 0.01% by weight of the compound of the preceding example is prepared in a vial. The vial is rotated for 20 hours. The percent demise of the nematodes present is 100%.

Example 3

Liquid 1,1,2-tri-(1-cyanoethyl) hydrazine is absorbed on fuller's earth in the proportion of 25 parts of the tri-cyanoethyl hydrazine for each 100 parts of fuller's earth.

A field to be planted with tomato seeds is dusted with the composition of this example at the rate of 750 pounds of the composition per acre (150 pounds of the active toxicant per acre). The field is subsequently plowed. The composition is effective in combating nematodes in the soil. There is a marked improvement in the stand of the plant as compared with untreated soil.

We claim:

1. As a new composition of matter: 1,1,2-tri-(1-cyanoethyl) hydrazine.

2. The method for preparing 1,1,2-tri-(1-cyanoethyl) hydrazine comprising condensing hydrazine hydrate with at least three mols but not more than about five mols of lactonitrile per mol of hydrazine hydrate at a temperature of from about 0° C. to 100° C. to thereby form 1,1,2-tri-(1-cyanoethyl) hydrazine.

3. A nematocidal composition comprising a pesticidal adjuvant as an inert solid carrier and as the essential active ingredient the compound: 1,1,2-tri-(1-cyanoethyl) hydrazine.

4. A method for controlling plant and tree damage caused by nematodes comprising the step of applying to a nematode-infested soil a composition containing 1,1,2-tri-(1-cyanoethyl) hydrazine as the active ingredient.

5. A method for controlling plant and tree damage caused by nematodes comprising the step of applying to a nematode-infested soil a composition containing 1,1,2-tri-(1-cyanoethyl) hydrazine as the active ingredient, the latter being applied at a rate of from about 50 to about 300 pounds per acre.

References Cited in the file of this patent

UNITED STATES PATENTS

| | | |
|---|---|---|
| 2,579,580 | Howk | Dec. 25, 1951 |
| 2,659,688 | Soule | Nov. 17, 1953 |
| 2,663,664 | Shore | Dec. 22, 1953 |

FOREIGN PATENTS

| | | |
|---|---|---|
| 744,675 | Great Britain | Feb. 15, 1956 |